United States Patent
Greenwood

(10) Patent No.: US 11,876,684 B1
(45) Date of Patent: Jan. 16, 2024

(54) CONTROLLED CROSS-CELL MIGRATION OF DATA IN CELL-BASED DISTRIBUTED COMPUTING ARCHITECTURE

(71) Applicant: Amazon Technologies, Inc., Seattle, WA (US)

(72) Inventor: Christopher Magee Greenwood, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 843 days.

(21) Appl. No.: 15/986,459

(22) Filed: May 22, 2018

(51) Int. Cl.
*H04L 41/14* (2022.01)
*H04L 67/1008* (2022.01)
*H04L 67/1019* (2022.01)

(52) U.S. Cl.
CPC .......... *H04L 41/14* (2013.01); *H04L 67/1008* (2013.01); *H04L 67/1019* (2013.01)

(58) Field of Classification Search
CPC .. H04L 41/14; H04L 67/1008; H04L 67/1019
See application file for complete search history.

(56) References Cited

U.S. PATENT DOCUMENTS

| | | | | |
|---|---|---|---|---|
| 2007/0016662 A1* | 1/2007 | Desai | ...................... | H04L 29/06 709/223 |
| 2007/0130566 A1* | 6/2007 | van Rietschote | ..... | G06F 9/4856 718/1 |
| 2007/0260732 A1* | 11/2007 | Koretz | ................ | H04L 67/1002 709/226 |
| 2011/0035620 A1* | 2/2011 | Elyashev | ............ | G06F 11/0727 714/48 |
| 2012/0324071 A1* | 12/2012 | Gulati | ................... | G06F 9/5044 709/223 |

(Continued)

OTHER PUBLICATIONS

MacCarthaigh, Shuffle Sharding: Massive and Magical Fault Isolation, AWS blog, Apr. 14, 2014. Retrieved from <https://aws.amazon.com/blogs/architecture/shuffle-sharding-massive-and-magical-fault-isolation/>. p. 1-5 (Year: 2014).*

(Continued)

*Primary Examiner* — Tonia L Dollinger
*Assistant Examiner* — Joseph M Cousins
(74) *Attorney, Agent, or Firm* — Knobbe, Martens, Olson & Bear, LLP

(57) ABSTRACT

Systems and methods are described for controlled migration of workloads between cell systems arranged in a cell-based architecture. Each cell system can implement a portion of an overall workload of the architecture, which may represent a network-accessible service. The isolation provided by cells may prevent widespread problems at the service, but may also conceal errors that might occur should workloads between the cells be redistributed. Such redistribution is often forced at inopportune moments, such as when a cell of the service has already failed. Systems and methods described herein enable detection of such errors by repeatedly migrating portions of workloads between cells. The system can monitor health information during or between migrations to ensure continued health of the service. If the service appears to be unhealthy after a migration, future migrations can be halted to enable a cause of the unhealthy state to be identified and rectified.

19 Claims, 8 Drawing Sheets

(56) References Cited

U.S. PATENT DOCUMENTS

| | | | |
|---|---|---|---|
| 2013/0036151 A1* | 2/2013 | Goyal | G06F 9/5016 709/201 |
| 2014/0310418 A1* | 10/2014 | Sorenson, III | H04L 67/288 709/226 |
| 2015/0019727 A1* | 1/2015 | Parakh | H04L 67/1004 709/225 |
| 2017/0097845 A1* | 4/2017 | Kouznetsov | G06F 9/45558 |
| 2018/0046581 A1* | 2/2018 | Banerjee | G06F 12/1009 |
| 2018/0074855 A1* | 3/2018 | Kambatla | G06F 9/50 |
| 2018/0097874 A1* | 4/2018 | Sampathkumar | H04L 67/1023 |
| 2018/0316749 A1* | 11/2018 | Sah | H04L 43/16 |
| 2019/0068699 A1* | 2/2019 | Nethercutt | H04L 47/70 |
| 2019/0306022 A1* | 10/2019 | Shimoga Manjunatha | H04L 47/122 |

OTHER PUBLICATIONS

Wikipedia, While Loop, 2018, Retrieved from < https://en.wikipedia.org/wiki/While_loop> on Nov. 11, 2021, Evidenced by the WayBack Machine, created May 2, 2018,, p. 1-10 (Year: 2018).*

* cited by examiner

US 11,876,684 B1

CONTROLLED CROSS-CELL MIGRATION OF DATA IN CELL-BASED DISTRIBUTED COMPUTING ARCHITECTURE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Particularly when using virtualization technologies, a variety of architectures have emerged for creating rapidly scalable network-based computing services. One such architecture is a "cell-based" architecture, in which a service is implemented across multiple "cells" of computing devices. Cell-based architectures can provide advantages such as increased resiliency, as issues that arise in one cell might be prevented from propagating to other cells.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
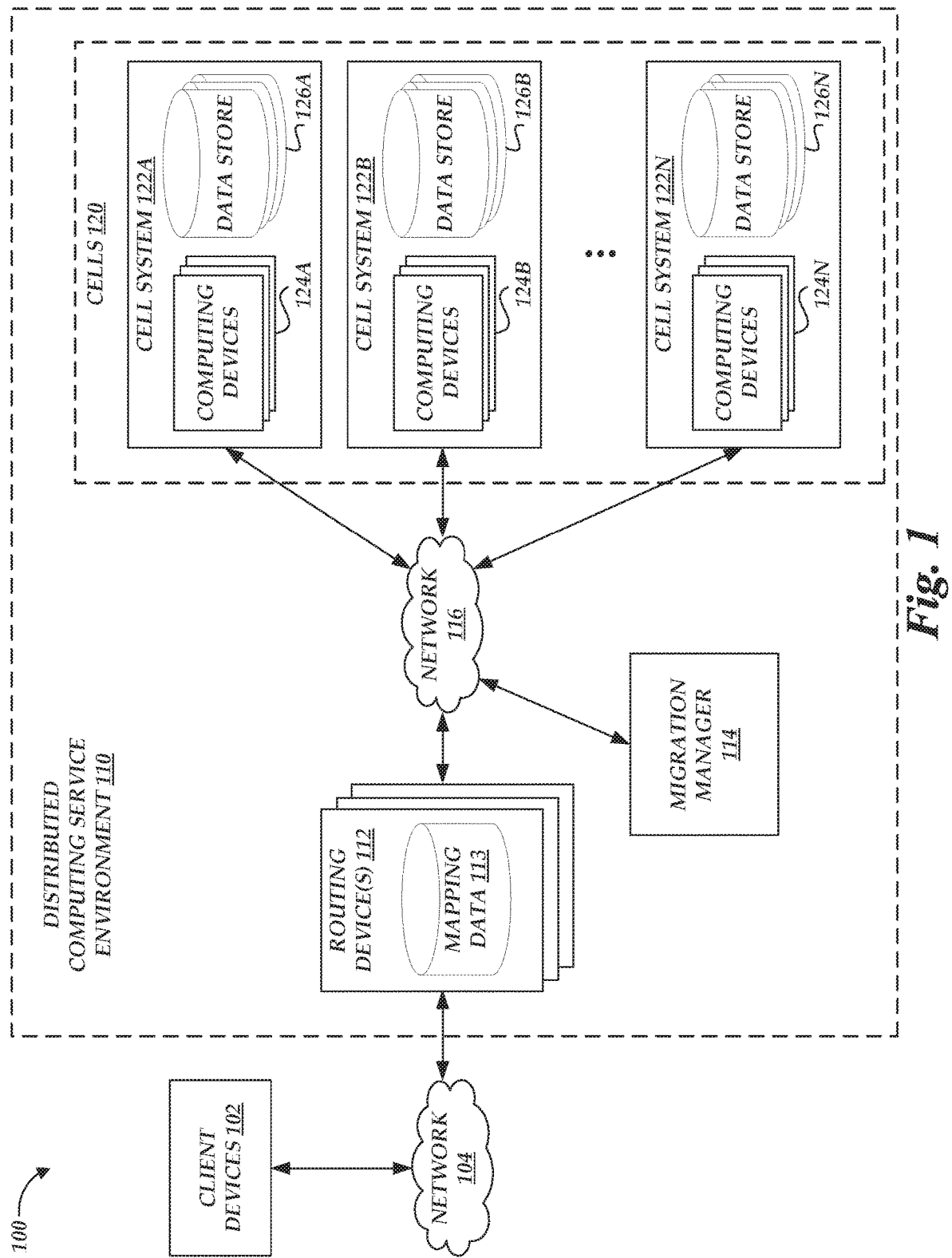
FIG. 1 is a block diagram depicting an illustrative environment in which a distributed computing service environment may implement a service using a cell-based architecture ("CBA"), and in which a migration manager may facilitate controlled migration of workloads between cells while limiting issue propagation due to such migration.

Generally described, aspects of the present disclosure relate to implementing controlled migration of workloads between cells of a network-accessible service that implements a cell-based architecture ("CBA"). In general, a CBA enables the computing devices that implement the service to be logically (and in some instances physically) isolated. Each cell within a CBA can represent one or more computing devices configured to provide a service (e.g., data storage services, processing services, etc.) independently from other cells. In some instances, each cell is assigned to a particular portion of the total workload of a service, which portion is often referred to as a "shard." The logical isolation of cells can provide benefits, such as a reduction in propagation of failures, errors, or issues that occur across cells. However, it is often inevitable that at some point, workloads must be migrated across cells. Such migrations may cause issues or errors that were previously hidden due to logical cell isolation. For example, a migration may uncover that a particular cell cannot handle operational loads above a certain capacity, or that two previously isolated workloads, when combined, generate errors within a cell. These issues are difficult to detect prior to migration, which often occurs under already adverse circumstances (e.g., the imminent failure of a cell). While a naïve replication of workloads across cells (e.g., such that any cell mirrors a given percentage of the workload of another cell) may assist in detecting these issues, this naïve replication can rob the system of benefits of a CBA, such as the limited propagation of errors. Thus, what is needed is a system which maintains the benefits of a CBA while operating to detect errors or issues that may otherwise be hidden due to operational parameters of a CBA.

The present disclosure provides such a system. Specifically, embodiments of the present disclosure enable controlled migration of workloads across cells within a CBA, while providing automatic monitoring of the cells, such that future migrations are halted when issues arise. For example, a distributed computing service environment may implement a migration manager that periodically selects workloads from a first cell to be migrated to a second cell, and causes such migration. The migration manager may then monitor a health metric of each cell, such as a number of errors reported at the cell, to determine whether the migration caused unhealthiness in any cell. If no unhealthiness is detected, the migration manager may continue to periodically cause migration and analyze the results of such migration for potential unhealthiness. When unhealthiness is detected, the manager can halt further migrations to prevent the propagation of errors due to those migrations. The manager may further notify another system or human operator as to the detected unhealthiness, such that a cause of the unhealthiness can be detected. In this manner, issues that may potentially arise during a non-controlled migration (e.g., due to adverse conditions on the CBA) may be detected and mitigated prior to that non-controlled migration, thus addressing the drawbacks of a CBA noted above. Moreover, because the migration manager can operated to detect healthiness on the CBA between periodic migrations, propagation of errors on the CBA can be minimized in a manner similar to complete isolation of workloads on the CBA.

As will be appreciated by one skilled in the art, a CBA may be utilized to implement any number of network-accessible services. In some instances, these services may be end-user-facing. For example, a CBA may be utilized to provide domain name system (DNS) resolution services, content distribution network (CDN) services, or the like, with which end user computing devices directly interact. In other instances, these services may be "back end" services, such as database or data storage services utilized by end-user-facing services. In some instances, the service provided by a CBA may be data-oriented. For example, each cell of a CBA may be configured to store and provide access to data of a portion of clients (which may be end users, other services, etc.). In other instances, a service may be process-oriented. For example, a CBA may be configured to provide data processing services (e.g., video conversion services, serverless code execution, etc.), and each cell of the CBA may operate to provide services for a subset of clients of the service. While embodiments of the present disclosure may be described with respect to migration of workloads between cells of a CBA, one skilled in the art will appreciate (in view of the present disclosure) that such workloads might represent client data or client processes handled at a particular cell. Thus, migration of workloads between cells of a CBA may be utilized to migrate either customer-originating data (e.g., data to be stored within a database) or CBA-generated data (e.g., data representing processing of the CBA, which may be generated for example as a result of a customer request to implement processing on the CBA).

As will be discussed below, a number of mechanisms may exist for migrating workloads between cells of a CBA. In one embodiment, migration of workloads may include removing data from a first cell and placing the data onto a second cell. For example, migration of workloads may include copying a particular client's database from a first cell to a second cell, or copying state information pertaining to processing conducted on behalf of a particular client. In another embodiment, migration of workloads data may include diverting data from a first cell to a second cell, such that the data need not actually exist on the first cell from which it is migrated. For example, where a first cell is configured to process workloads associated with the first client, migration of workloads from the first cell may include redirecting workload requests from that first client to a second cell, such that the first client's workload is migrated to the second cell. Thus, migration of workloads between cells, unless otherwise specified, should be understood to potentially include copying of workload data from one cell to another, redirection of workload data from one cell to another, or a combination thereof. Illustratively, copy-based migration (e.g., copying workload data from a first cell to a second cell) may be beneficial in instances where the data or workload on a cell is relatively stable, such as when a cell provides long-term data storage services. Redirection-based migration (e.g., redirecting client requests to a different cell than would otherwise occur) may be beneficial in instances where the data or workload of a cell is dynamic or rapidly changing, such as when a cell provides processing services within a relatively short period of time (e.g., on the order of milliseconds, seconds, minutes, etc.,). Examples of such dynamic services might include, by way of non-limiting example, end-user-facing DNS resolution services, serverless code execution services, and the like.

As will be appreciated by one of skill in the art in light of the present disclosure, the embodiments disclosed herein improves the ability of computing systems, and particularly computing systems utilizing a cell-based architecture, to detect errors that might otherwise be obscured due to logical isolation of workloads between cells while still maintaining benefits of the cell-based architecture, such as the limited propagation of errors or issues between cells. These improvements are provided by operation of a migration manager, as disclosed herein, to provide controlled migration of workloads between cells while monitoring, analyzing, and acting on health information of the cells during or after migration. Moreover, embodiments of the present disclosure address technical problems in the field of distributed computing, such as the difficulty of providing a stable, scalable architecture that is resistant to error propagation but also can support migration of workloads under adverse conditions, without incurring unforeseen errors during that migration. These problems are addressed by the controlled cell migration disclosed herein, which enables detection of errors that might occur during migrations without eliminating the propagation-limiting benefits of a CBA. The present disclosure thus represents a significant improvement on existing distributed computing systems.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a distributed computing service environment 110 may implement a network-accessible service utilizing a CBA. The service may be accessible to one or more client devices 102 via a network 104, and be implemented by the distributed computing service environment 110 across a number of cells 120. Each cell may include one or more computing devices 124, data stores 126, and the like that form a computing system which implements the cell. Each such computing system is generally referred to herein as a "cell system 122." Each cell system 122 can be configured to provide the service to at least a portion of the client devices 102, and thus support a "shard" of the service (e.g., a portion of a workload handled by the service). As discussed in more detail below, the distributed computing service environment 110 may include one or more routing devices 112 that direct communications of client devices 102 to an appropriate cell system 122 within the cells 120 of the CBA. In accordance with embodiments of the present disclosure, the distributed computing service environment 110 of FIG. 1 includes a migration manager 114 configured to implement controlled migration of workloads between the cells 120, to facilitate detection of issues or errors that may occur during migrations. The components of the distributed computing service environment 110 may also communicate via a network, which is shown in FIG. 1 as network 116. The network 116 may in one embodiment be the same network as network 104. In another embodiment, the network 116 may be different than the network 104.

The networks 104 and 116 may include any wired network, wireless network, or combination thereof. For example, networks 104 and 116 may be a personal area network, local area network, wide area network, over-the-air broadcast network (e.g., for radio or television), cable network, satellite network, cellular telephone network, or combination thereof. As a further example, the networks 104 and 116 may be a publicly accessible network of linked networks, possibly operated by various distinct parties, such as the Internet. In some embodiments, the networks 104 and 116 may be a private or semi-private network, such as a corporate or university intranet. The networks 104 and 116 may include one or more wireless networks, such as a Global System for Mobile Communications (GSM) network, a Code Division Multiple Access (CDMA) network, a Long Term Evolution (LTE) network, or any other type of wireless network. The networks 104 and 116 can use protocols and components for communicating via the Internet or any of the other aforementioned types of networks. For example, the protocols used by the networks 104 and 116 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein.

Client devices 102 may include any number of different computing devices communicating with the distributed computing service environment 110 to utilize a service provided by the environment 110. For example, individual client devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Client devices 102 may in some instances be end-user devices. Client devices 102 may in other instances be non-end-user devices, such as servers or other devices that themselves provide user-facing services.

To access the service provided on the distributed computing service environment 110, client devices 102 may interact with one or more routing devices 112. The routing devices 112 or cell systems 122 may provide an interface, such as a graphical user interface ("GUI"), command line interface ("CLI"), application programming interface ("API"), or the like through which client devices 102 may submit requests to the distributed computing service environment 110. The routing devices 112 may operate to route such requests to an appropriate cell system 122 within the cells 120 of the CBA. In one embodiment, the frontend 112 may implement routing of client requests based on information related to a client device 102, such as an account associated with the client device 102 on the distributed computing service environment 110. Illustratively, the frontend 112 may be configured, by default, to route client requests based on an account identifier associated with the client device 102. For example, the routing devices 112 may implement a consistent hash ring algorithm, such that the account identifier associated with a client request is hashed, and the requests are distributed to a cell system 112A based on the hash of the account identifier. In another embodiment, the routing devices 112 may route requests via a load-balancing algorithm, such that the amount of workload at each cell system 122 is load balanced.

The routing devices 112 may include a mapping data store 113 to facilitate mapping of client device 102 communications to cell systems 122. As will be discussed in more detail below, the mapping data 113 may be modified to redirect client requests from a default cell system 122 to another cell system 122, either after migration of data between such systems 112 (e.g., with copy-based migration) or as a mechanism to effect that migration (e.g., with redirection-based migration). The mapping data store 113 can correspond to any persistent or substantially persistent data store, such as a hard drive (HDD), a solid state drive (SDD), network attached storage (NAS), a tape drive, or any combination thereof.

As noted above, each cell system 112 can include one or more computing devices 124 and data stores 126 configured to implement a service of the distributed computing service environment 110 with respect to some portion of the workload handled by the service. Because the particular service implemented on the distributed computing service environment 110 varies according to embodiments of the present disclosure, the particular configuration of computing devices 124 and data stores 126 may also vary. In one embodiment, the devices 124 and data store 126 are configured to implement a "solution stack" or "software stack" for the service, such that the service can be implemented within a cell system 112 independently from operation of other cell systems 122, and potentially independently of other external services. Like the mapping data store 113, the data stores 126 can correspond to any persistent or substantially persistent data store, such as a hard drive (HDD), a solid state drive (SDD), network attached storage (NAS), a tape drive, or any combination thereof. While a limited number of cell systems 122 are shown within FIG. 1 (labeled cell systems 122A through 112N, cells 120 may include any number of cell systems 122.

In accordance with embodiments of the present disclosure, the distributed computing service environment 110 further includes a migration manager 114 configured to implement controlled migration of workloads between cells 120 and to detect issues or errors that occur due to such migration. As will be described in more detail below, the migration manager 114 can be configured to periodically cause migration of a subset of a workload from one cell system 122 to another cell system 122, to collect information indicating a health of the cells 120, and to analyze the health information to detect unhealthiness in the cells 120. While any number instances may cause unhealthiness of a cell, illustrative examples may include unhealthiness cause by the operational capacity of a cell system 122 exceeding a threshold amount (e.g., above that which the cell would reach during normal operation given load-balancing on the distributed computing service environment 110) by incompatible workloads being handled by the same cell system 122. Unhealthiness may be identified based on health information generated for a cell system 122, such as a responsiveness of the cell system 122 to requests (e.g., a percentage of requests for which an acknowledgement is sent, a latency of response, etc.), a number of errors generated at the cell system 122, or a computing resource usage of the cell system 122 (e.g., bandwidth, memory, or processing power used at the cell system 122). To detect unhealthiness, the migration manager 114 can be configured to periodically cause a migration of workloads from one cell system 122 to another, and to monitor health information for the cell system 122 to determine whether unhealthiness exists. If so, future migrations may be halted, and a report may be sent to another system or human operator, such that a cause of the unhealthiness may be identified. Otherwise, the migration manager 114 may continue (e.g., during operation of the distributed computing service environment 110) to periodically migrate workloads between the cells 120. In this manner, should it become necessary to migrate workloads between cells 120 (e.g., during adverse conditions on the distributed computing service environment 110, such as failure of a cell system 122), the migration can be expected to complete without causing unhealthiness on the distributed computing service environment 110.

It will be appreciated by those skilled in the art that the distributed computing service environment 110 may have fewer or greater components than are illustrated in FIG. 1. In addition, the distributed computing service environment 110 could include various web services and/or peer-to-peer network configurations. Thus, the distributed computing service environment 110 FIG. 1 should be taken as illustrative. For example, in some embodiments, components of the distributed computing service environment 110, such as the cell systems 122, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the cell systems 122 (including their respective computing devices 122 and data stores 126), routing devices 112, and migration manager 114 may be embodied in a plurality of components, each executing an instance of the respective cell systems 122, routing devices 112, and migration manager 114. A server or other computing component implementing any one or part of the cell systems 122, routing devices 112, and migration manager 114 may include a network interface, memory, processing unit, and computer readable medium drive, all of which may communicate which each other may way of a communication bus. The network interface may provide connectivity over the network 104, network 116, and/or other networks or computer systems. The processing unit may communicate to and from memory containing program instructions that the processing unit executes in order to operate the respective cell systems 122, routing devices 112, and migration manager 114. The memory may generally include RAM, ROM, other persistent and auxiliary memory, and/or any non-transitory computer-readable media.

Figure 2:
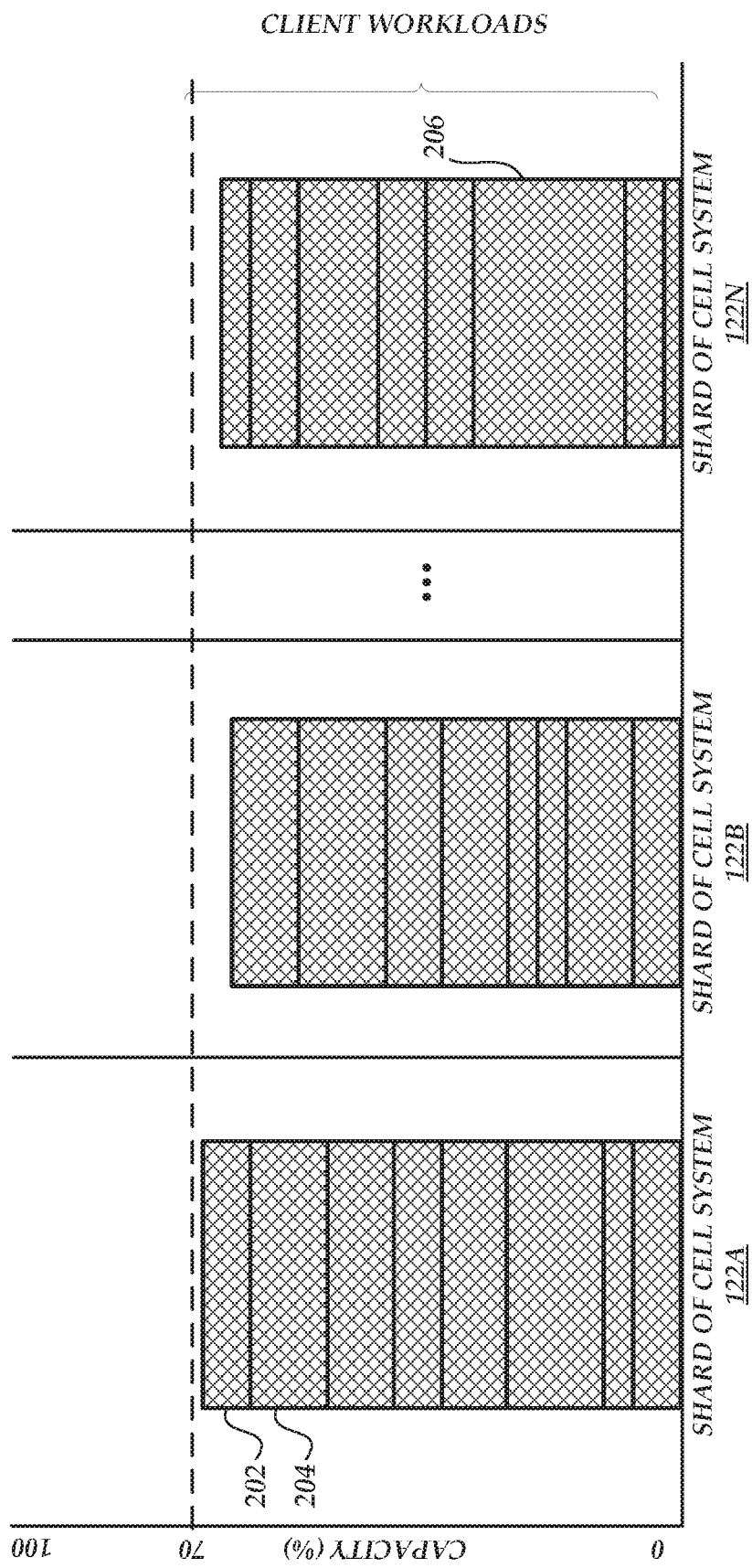
FIG. 2 depicts an illustrative visualization of workloads across multiple cells within the CBA of FIG. 1 prior to migration of workloads between cells.

With reference to FIG. 2, an illustrative visualization and graphical depiction of workloads of the cells 120 of the distributed computing service environment 110 is shown. Specifically, the visualization of FIG. 2 depicts the workloads of cell systems 122A through 122N as a portion of the operational capacity of the systems 122. In one embodiment, operational capacity is defined according to computing resource usage of a computing system 122 (e.g., bandwidth, processing power, memory, etc.). In another embodiment, operational capacity is defined according to other logical constructs, such as a number of requests per second handled at the system 122, or a total amount of data handled by the system 122, or the like (which constructs may be tied, for example, to an expected usage of computing resources at a system 122). As shown in FIG. 2, each of the cells 120 within the CBA is for illustrative purposes shown as having an equivalent use of operational capacity, at just under 70%. This may be due, for example, to load balancing implemented by the routing devices 112. The capacity of each cell system 122 is illustratively used to provide a portion of the service of the distributed computing service environment 110, which portion represents a "shard" of the service. Each shard is illustratively made up of workloads associated with individual clients of the service. For example, portion 202 may be workloads associated with a first client account, portion 204 may be workloads associated with a second client account, and portion 206 may be workloads associated with a third client account.

The distribution of workloads shown in FIG. 2 may have benefits to the distributed computing service environment 110, in accordance with the benefits of cell isolation in a CBA. For example, should a portion of a workload within a first shard prove detrimental to operation of the distributed computing service environment 110 (e.g., storing malicious data or data that otherwise induces errors on a cell system 122), that detriment can be expected to be isolated to an individual cell system 122 (such isolation of detrimental effect is sometimes referred to as limiting the "blast radius" of the effect). Moreover, the distributed computing service environment 110 may be configured to introduce new cell systems 122 as the capacity of existing systems 122 reaches a threshold level (e.g., 70% utilization), such as by allocating additional resources within a hosted computing environment. Thus, the CBA depicted in FIG. 2 may enable the distributed computing service environment 110 to be rapidly resized to meet current demand.

However, the distribution of FIG. 2 may also have detrimental effects. For example, by increasing or decreasing the number of cell systems 122 of the distributed computing service environment 110 to maintain operational capacity below a threshold level, it may be difficult or impossible to detect errors that might occur at high operational uses. Moreover, these errors may be isolated to individual cell systems 122 (e.g., due to a faulty physical configuration of the underlying host devices), and thus difficult or practically impossible to identify by manually inducing high operational load on an individual cell system 122. If adverse conditions were to occur on the distributed computing service environment 110, the environment 110 may be forced however to migrate workloads between the cells 120, causing one or more cell systems 122 to exceed the preferred threshold operational capacity and thus incur these difficult-to-detect errors. Discovery of errors during already adverse conditions may worse those conditions, leading to a failure of the distributed computing service environment 110.

Other potential errors may also be made difficult or practically impossible to detect based on the distribution of FIG. 2. For example, scenarios may exist where workloads of different clients interact negatively. Illustratively, handling both the portions 202 and 204 may have no apparently negative consequence to the cell system 122A. However, if these portions were combined with the portion 206 on a given cell system 122, the system 122 may experience detrimental effects. These effects could be caused, for example, where the portions 202 and 206 both attempt to utilize large amounts of a single type of computing resource (e.g., bandwidth) but underutilize a different computing resource (e.g., memory) that is also used to calculate operational load. Thus, combining portions 202 and 206 on a single cell system 122 may cause detrimental effects to the operation of the system 122 without necessarily causing the operational load of the system 122 to exceed a threshold capacity.

Figure 3:
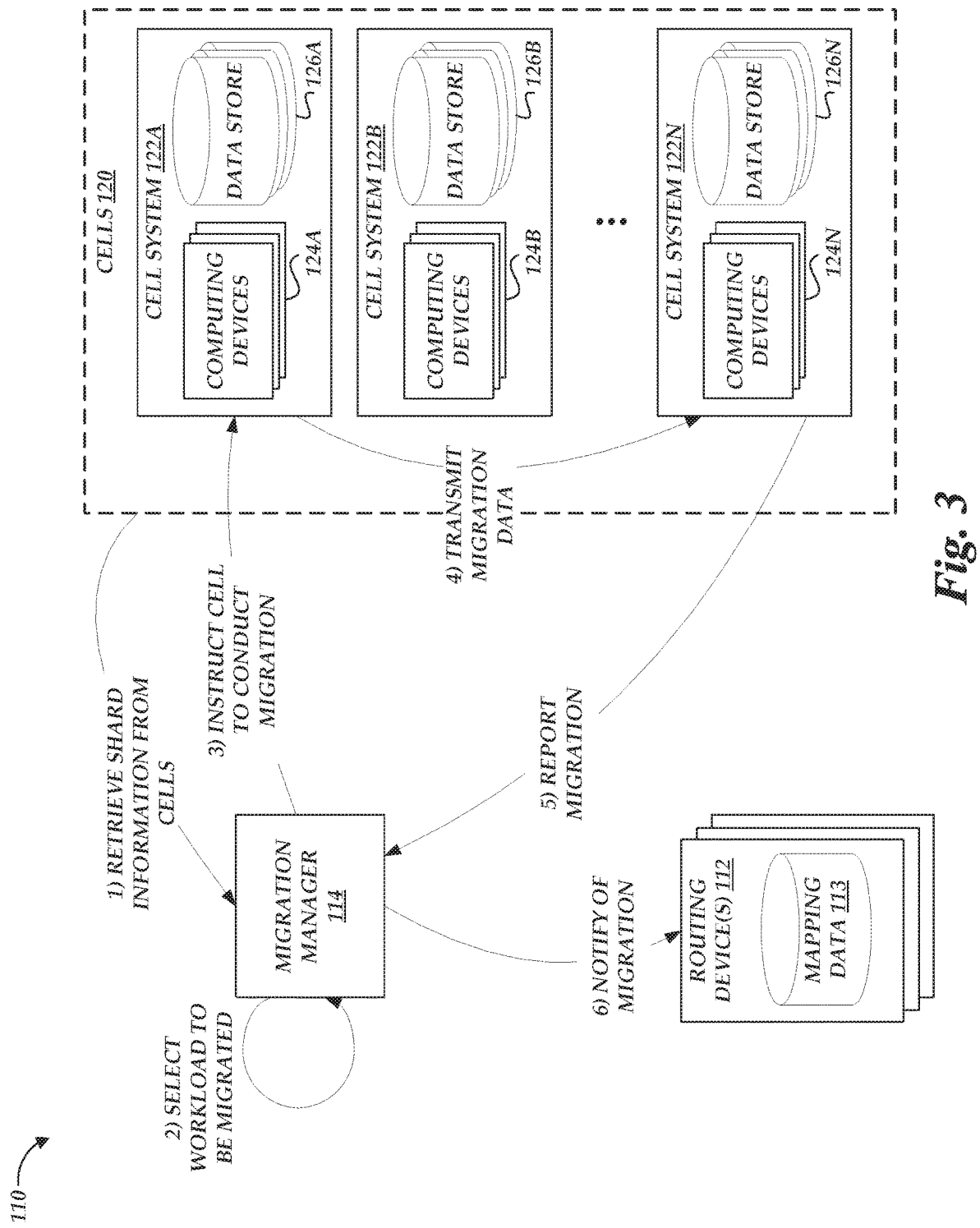
FIG. 3 is a flow diagram depicting illustrative interactions for controlled migration of workloads between cells within the CBA of FIG. 1.

To identify these potential errors without requiring the presence of adverse conditions, the migration manager 114 may operate to periodically conduct controlled migration of workloads between cell systems 122 in a manner that maintains the benefits of the CBA (e.g., a reduction in "blast radius" of detrimental effects). Illustrative interactions for initiating such controlled migration are depicted in FIG. 3. The interactions of FIG. 3 may be initiated during healthy operation of the distributed computing service environment 110. In some instances, the migration manager 114 may be configured to analyze health information of the cells 120 to verify healthiness of the distributed computing service environment 110 prior to undertaking the interactions of FIG. 3. Illustrative interactions for such analysis are described below with reference to FIG. 5.

The interactions of FIG. 3 begin at (1), where the migration manager 114 retrieves shard information from the cells 120. The shard information may include, for example, the current workloads handled by each cell system 122 of the cells 120. In one embodiment, the shard information is provided on a per-client basis, and the migration manager 114 may be configured to select client-specific portions of workloads to migrate between cells 120.

At (2), the migration manager 114 utilizes the retrieved shard information to select workloads to be migrated between cell systems 122. In the embodiment of FIG. 3, the workloads to be migrated are assumed for illustrative purposes to be migrated from a single cell system 122 to another single cell system 122. However, in other embodiments, workloads may be migrated from a single cell system 122 to multiple cells systems 122, from multiple cell systems 122 to a single cell system 122, or from multiple cell systems 122 to multiple cell systems 122. The amount of workload selected to be migrated may be preconfigured by an administrator of the distributed computing service environment 110, or may be determined dynamically during operation of the migration manager 114. Illustratively, the migration manager 114 may determine the amount of workload to migrate based on an expected impact of that migration on the client's associated with the migrated workloads (e.g., a reduction in responsiveness of the service during migration), based on an expected duration of the migration (e.g., such that given current operation of the environment 110 migration is expected to occur within n seconds, minutes, etc.), or based on a target utilization of operational capacity of at least one cell system 120 (e.g., such that if a given percentage of workload is randomly migrated between two cell systems 122 every n seconds, at least one cell system 122 is statistically expected to reach a target utilization of operational capacity within m seconds).

In one embodiment, the specific cell systems 122 involved in migration, and the workload of that system 122 to be migrated, are selected randomly by the migration manager 114. In another embodiment, the specific cell systems 122 and/or workload may be selected according to a pre-determined algorithm, such as a "round robin" selection algorithm. In some instances, certain cell systems 112, or workloads handled by such systems 112, may be disqualified from selection by the migration manager 114. For example, the manager 114 may be configured such that a system 112, or workload handled by the system 112 is disqualified from selection if they were selected for migration in any of a past n number of migrations of workloads between the cells 120. As another example, specific clients of the environment 110 may request to opt-out of controlled migration (e.g., to reduce a likelihood that a service provided by the environment 110 becomes unavailable to the client), and thus the migration manager 114 may disqualify from selection portions of workload associated with the clients.

At (3), after selecting the workload to be migrated as well as the target cell system 122 to which it is to be migrated, the migration manager 114 transmits instructions to the cell system 122 handling the to-be-migrated workload (the "source" cell system 122) to initiate a migration to a target cell system 122. Thereafter, at (4), the source cell system 122 (cell system 122A in FIG. 3) transmits relevant migration data to the target cell system 122 (cell system 122N in FIG. 3). The relevant migration data mat include, for example, client data to be migrated or data otherwise representing a workload to be migrated. At (5), the cell system 122N reports successful migration to the migration manager 114.

Thereafter, at (6), the migration manager notifies the routing devices 112 that migration of data has occurred, and thus that client requests relevant to the migrated data should be directed to the target cell system 122.

While illustrative interactions are depicted in FIG. 3, one skilled in the art will appreciate that interactions may vary from those of FIG. 3 in different embodiments of the present disclosure. For example, the interactions of FIG. 3 illustrative depict a copy-based migration, involving transfer of data from a first to a second cell system 122 (e.g., client data, state of processing, etc.). However, in other embodiments of the present disclosure, alternative migrations, such as redirection-based migrations, may additionally or alternatively be used. For example, the migration manager 114, rather than transmitting instructions to a cell system 122 to transmit migration data to another cell system 122, may transmit instructions to the routing devices 112 to redirect client communications from a first cell system 122 to a second cell system 122. In this manner, migration may occur without requiring transfer of data between cell systems 122. Moreover, the interactions of FIG. 3 depict a specific mechanism for updating mapping data 113 of routing devices 112 (e.g., by notifying the devices 112 after migration has been completed), which may for example cause a source cell system 122 (e.g., cell system 122A) to continue to service client requests until migration has completed. Other mechanisms for updating mapping data 113 may additionally or alternatively be implemented in embodiments of the present disclosure. For example, the migration manager 114 may implement a "two-phase commit" protocol, whereby the routing devices 112 are notified of a migration before it is initiated as well as after it has completed. In such an embodiment, the routing devices 112 may implement functionalities to determine an appropriate routing of any requests received after migration initiation but prior to completion (e.g., by querying source and target cell systems 122 for a location of data and routing the request to an appropriate system 122). As yet another example, the migration manager 112 may update the mapping data 113 at migration initiation to cause all client requests to be routed to a destination cell system 122 immediately on migration initiation. Illustratively, this immediate redirection might be enabled by causing a target cell system 122 to implement "pass through" functionality with respect to a source system 112, such that data needed to service a client request but not yet available at the target cell system 122 during migration is read from the source system 112 and used to service the client request. Thus, a variety of mechanisms exist for modifying mapping data 113 and handling client requests during a migration.

Figure 4:
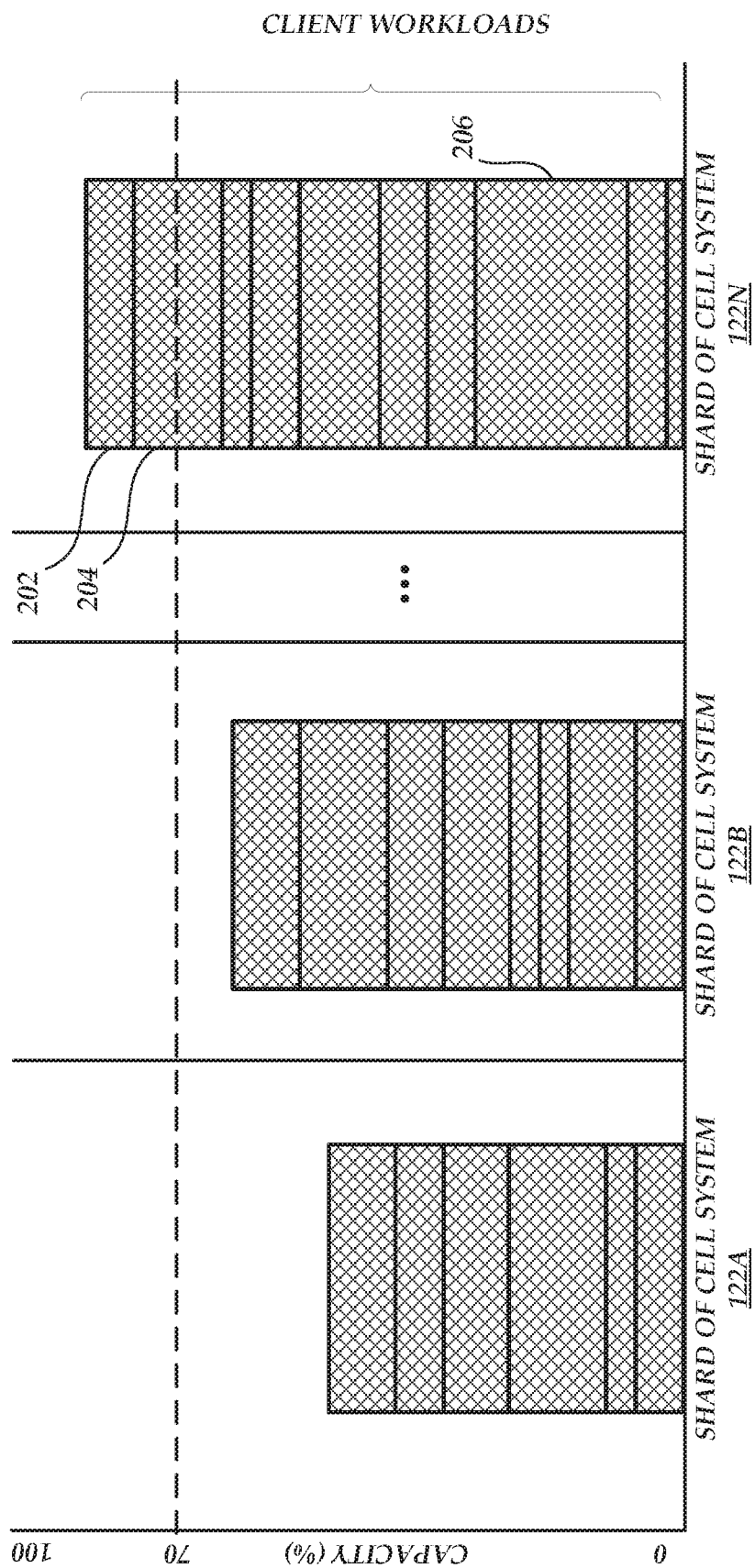
FIG. 4 depicts an illustrative visualization of workloads across multiple cells within the CBA of FIG. 1 subsequent to migration of workloads between cells.

FIG. 4 depicts the illustrative visualization and graphical depiction of FIG. 2, as modified based on a migration, such as the migration of FIG. 3. Specifically, relative to the depiction of FIG. 2, the distribution of workloads in FIG. 4 shows that client portion 202 and 204 have been migrated from cell system 122A to cell system 122N. Thus, if for example the cell system 122N experiences detrimental effects when exceeding a threshold (e.g., 70%) utilization of operational capacity, or if co-tenanting client portions 202, 204, and 206 on a single cell system 122 were to cause detrimental effects to that system 122, the distribution of FIG. 4 would be expected to cause those detrimental effects.

As noted above, the migration manager 114 is configured in certain embodiments to control migration between cells 120 based on an analysis of whether a prior migration caused detrimental effects to the environment 110. Illustratively, the manager 114 can be configured to continue to cause periodic migrations so long as detrimental effects do not occur. In this manner, the manager 114 can continuously "shuffle" the workloads of different cells, to detect whether various distributions of workloads case detrimental effects on the system. When a detrimental effect is detected, the manager 114 can halt further migrations, thus attempting to limit the spread of the detrimental effect past the individual cell system 122 in which the effect is observed. The manager 114 may report occurrence of the detrimental effect to another system or human operator, such that the cause of the effect can be isolated and corrected. Thus, the chances of detrimental effect occurring during forced migration (e.g., during adverse conditions on the environment 110) can be reduced.

Figure 5:
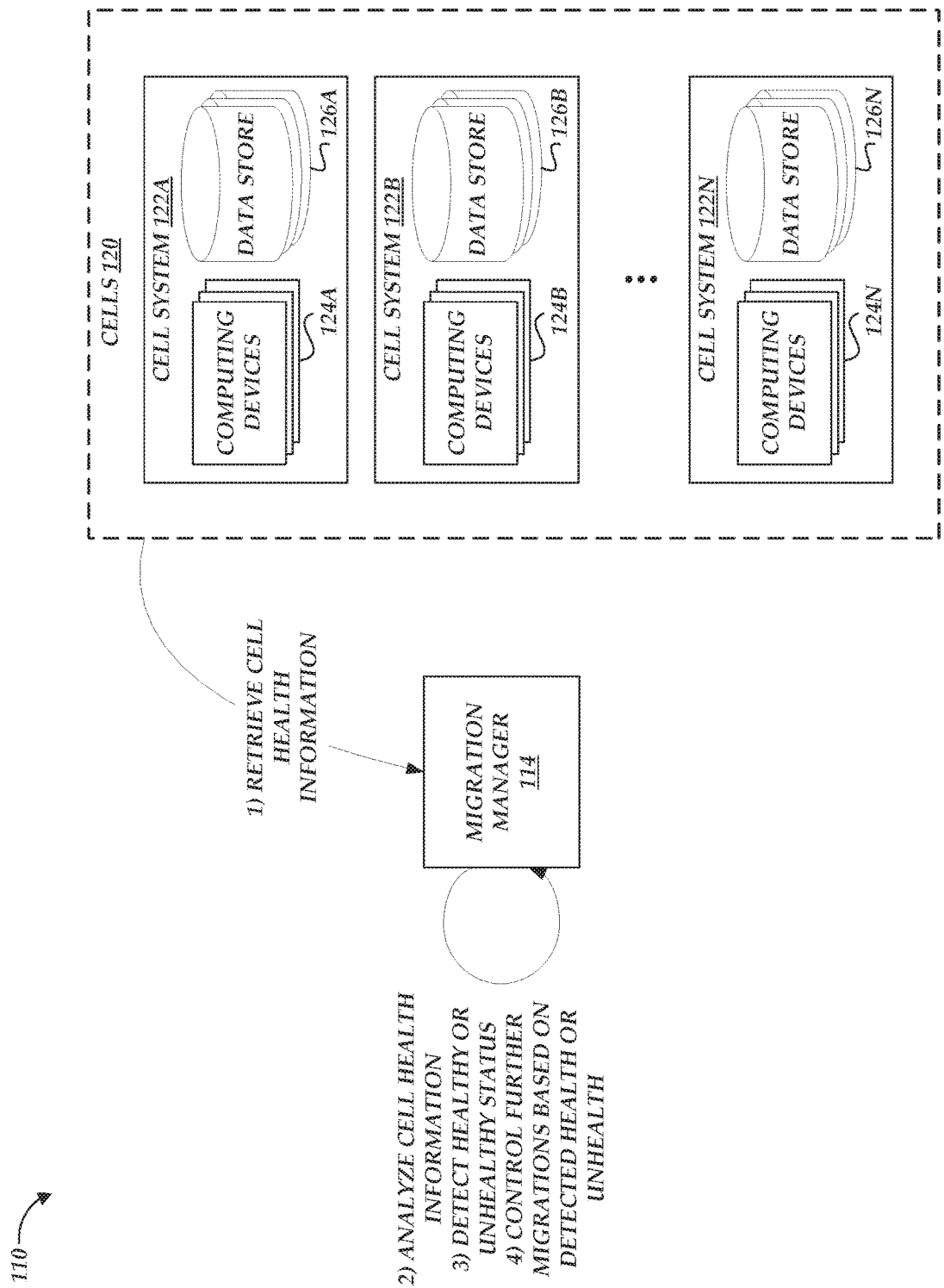
FIG. 5 is a flow diagram depicting illustrative interactions for analyzing an effect of controlled migration of workloads between cells within the CBA of FIG. 1, and for controlling further migrations based on such analysis.

Illustrative interactions for detecting detrimental effects on the environment 110 correlated or due to controlled migration are depicted in FIG. 5. The interactions begin at (1), where the migration manager 114 retrieves cell health information. The health information can include a variety of data indicative of the ability of the cells 120 to provide an associated service to clients. In one embodiment, health information includes machine-generated data regarding operation of devices within individual cell systems 122, such as records of computing resource usage on devices within the systems 122, errors generated by the devices, information regarding responses of the devices to client device 102 communications (e.g., percentage of successful responses, response time, etc.) and the like. In another embodiment, health information includes human-generated information, such as error or issue reports submitted to the environment 110 regarding a client's use of the service. While depicted as provided by the cells 120, health information may in some instances be provided wholly or partially from other devices. For example, a component of the environment 110 or external to the environment may conduct "heartbeat" testing or other health testing (e.g., wherein data is transmitted to the cells 120 to verify that an expected response is returned), and report the results of such testing as health information for the cells 120. Health information may, for example, be provided with respect to aggregated cells 120, individual cells systems 122, individual devices within cell systems 122, etc.

At (2), the migration manager 114 analyzes the cell health information to determine whether the cells 120 (or individual cell systems 122) are healthy. Illustratively, the migration manager 114 may maintain thresholds for healthiness corresponding to a given type of health information. For example, the migration manager 114 may determine that a cell system 122 is healthy so long as 99.9% of responses are successful, or so long as computing resource usage falls below a threshold level. Threshold levels for detecting healthiness may be set, for example, by an administrator of the environment 110. Additionally or alternatively, threshold levels may be determined dynamically at the migration manager 114. Illustratively, the migration manager 114 may set threshold levels for an individual cell system 122 based on statistical analysis of thresholds for other cell systems 122. For example, health information for a first system 122 may be determined to indicate health so long as that information falls within n standard deviations (e.g., 1) of the average information for other systems 122. Accordingly, the migration manager 114, at (2), can compare the obtained health information to thresholds for such health information. At (3), from this analysis, the migration manager 114 determines whether each cell system 122 of the cells 120, and/or the cells 120 as an aggregate, are healthy.

Thereafter, at (4), the migration manager 114 can control subsequent migrations based on the detected healthiness or unhealthiness of the cell systems 122. Illustratively, where the cells 120 are detected to be healthy, the migration manager 114 can initiate an additional migration of data between cells 120. Where the cells are detected to be unhealthy, the migration manager 114 can halt further migrations, such that a cause of the unhealthiness can be determined and addressed.

In one embodiment, the interactions of FIG. 5 occur subsequent to a migration, over a period of time sufficient to ensure healthiness of the cells 120 due to that migration. Illustratively, an administrator of the environment 110 may establish a period (e.g., n seconds, minutes, etc.) over which health information should be analyzed, subsequent to a migration, to establish healthiness of the cells 120. Thus, the interactions (e.g., interactions (1) through (3)) of FIG. 5 may occur over that period of time, potentially repeatedly and/or concurrently. Illustratively, interaction (1) may include gathering health information beginning from a point in time at which migration begins, or from a point in time after the migration completes. Interaction (2) may include continuously analyzing that health information until sufficient information has been collected (e.g., over the established period) to verify the healthiness or unhealthiness of the cells 120 due to the migration. Thus, while described linearly, one skilled in the art will appreciate that the interactions of FIG. 5 may occur over a period of time, potentially including concurrent or repeated interactions.

Figure 6:
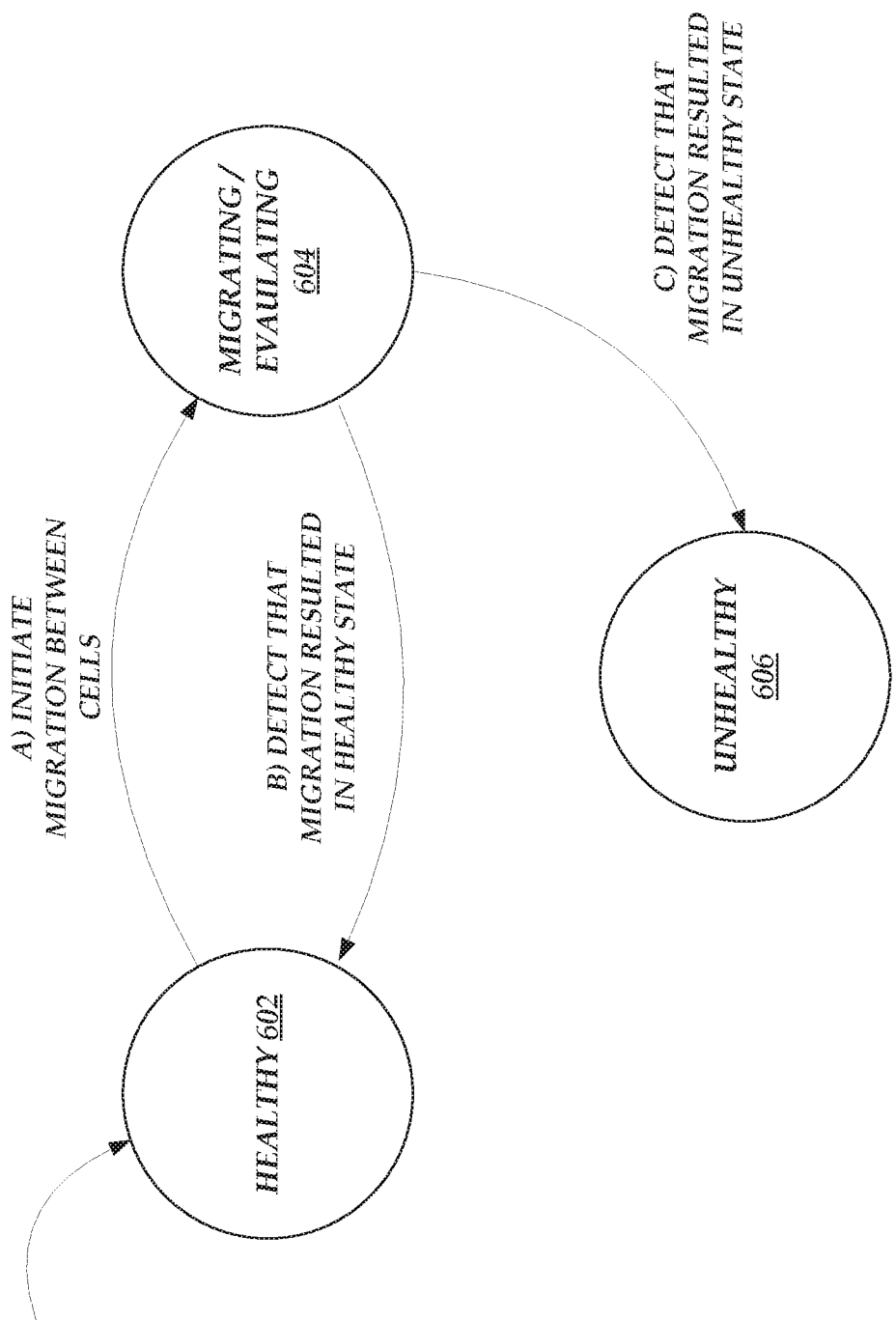
FIG. 6 is a state diagram indicating example states of a distributed computing service environment implemented controlled migration between cells of the CBA of FIG. 1.

With reference to FIG. 6, an illustrative state diagram is depicted for various states of the environment 110 during controlled cross-cell migration. Illustratively, the environment 110 may begin at a healthy state 602, indicating normal operation of the environment 110 to provide a network accessible service. The environment 110 may then transition to a migrating/evaluation state 604, via operation of the migration manager 114 as discussed above. Specifically, at least a portion of the workload handled by one cell system 122 of a CBA of the environment 110 can be migrated to another cell system 122, a indicated by edge A. During the migrating/evaluation state 604, health information may be gathered (e.g., by a migration manager 114) for the cells 120, to detect whether the environment 110 returns to the healthy state 602. If so, the environment 110 returns to state 602 via edge B. Alternatively, if the environment 110 does not return to the healthy state 604 (e.g., if health information indicates unhealthiness of the environment 110), the environment 110 transitions to unhealthy state 606, indicated by edge C.

As can be seen from the state diagram of FIG. 6, the environment 110 during operation may periodically transition between various states, such as the healthy state 602 and the migrating/evaluation state 604, so long as the environment 110 remains healthy. Thus, workloads can be constantly shifted between cell systems 122 within a CBA. However, if migration of workloads causes the system to enter an unhealthy state, subsequent migrations of workloads are halted, such that propagation of underlying issues causing the unhealthy state can be minimized. In this way, benefits of isolation within a CBA can be maintained while also addressing the issues of such isolation.

Figure 7:
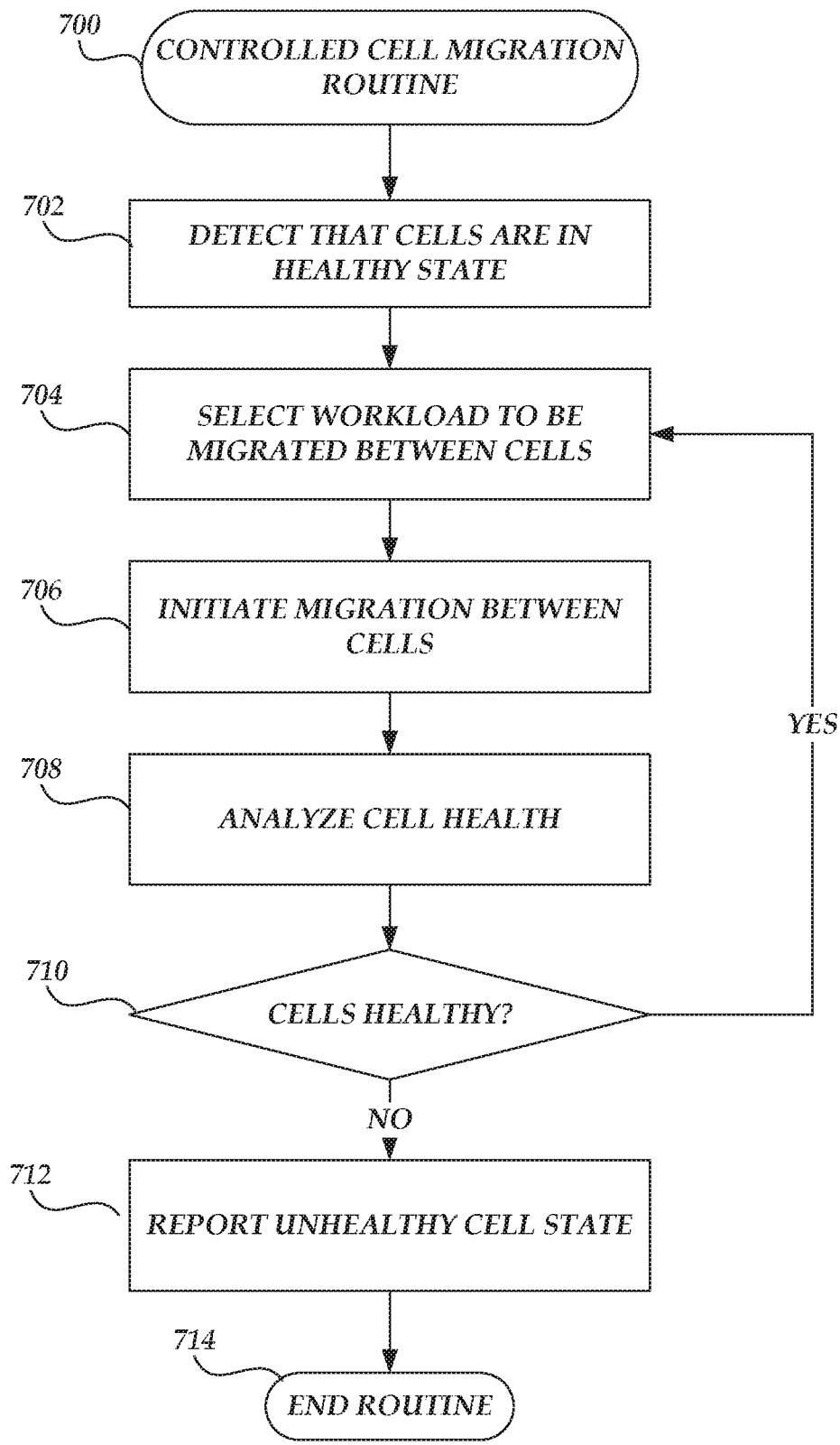
FIG. 7 depicts an illustrative controlled cell migration external task call routine that may be implemented by a remote interface task executing on a coordinator of FIG. 1.

One illustrative routine 700 for implementing controlled migration between cells of a CBA is depicted in FIG. 7. The routine 700 may be implemented, for example, by the migration manager 114 of FIG. 1.

The routine 700 begins at block 702, where the migration manager 114 detects that cells 120 of the CBA (e.g., individual cell systems 122) are in a healthy state. As noted above, such a healthy state may be detected based on analysis of health information from the cells 120, such as by verifying that the health information does not exceed thresholds indicating a lack of health of the environment 110.

Thereafter, at block 704, the migration manager 114 selects workload to be migrated between cells 120 of the CBA (e.g., between individual cell systems 122). As noted above, the specific cell systems 122 involved in the migration, and the workload to be migrated, may be for example randomly selected or selected according to predetermined algorithms (e.g., round robin rotation). In one embodiment, the workload to be migrated is selected based on a desired state of the environment, such as an individual cell system 122 reaching a threshold operating capacity and/or the migration completing within a threshold period of time.

At block 706, the migration manager 114 initiates migration of the selected workload between the cell systems 122. In one embodiment, the migration manager 114 transmits instructions to a source cell system 122 to migrate data representing the workload to a target cell system 122. In another embodiment, the migration manager 114 transmits instructions to a frontend 112 to cause redirection of client communications from a source cell system 122 to a target cell system 122. Thus, workload of the source ell system 122 can be transferred to the target cell system 122.

At block 708, the health manager can again analyze cell health information to determine whether the cells are in a healthy state. As noted above, cell health information may include machine-generated health information (e.g., metrics indicative of an availability of the cell systems 122 to provide a service) as well as human-generated health information (e.g., error reports). Cell health information may be obtained from individual cell systems 122 or external devices, such as health checking devices.

At block 710, implementation of the routine 700 varies according to a healthiness of the cells 120. If the cells 120 continue in a healthy state, the routine 700 returns to block 704 and proceeds, potentially continuously, during operation of the environment. Alternatively, if at block 710 it is determined that the cells are unhealthy, the routine 700 proceeds to block 712, where the migration manager 114 reports the unhealthy cell state to an external system or human operator. The report generated at block 712 may include information generated by the migration manager 114 regarding potential causes of the unhealthy state. For example, the report may indicate the workload migrated prior to detecting the unhealthy state, configuration information for cell systems 120 involved in the migration, and health information indicating an unhealthy state of the cells 120. On receipt of the report, a system or operator can then function to diagnose the cause of the unhealthy state, and to correct that cause. Thus, potential issues that might occur during a forced migration of workloads between cells 120 can be preemptively detected and corrected, before occurring under adverse conditions.

One skilled in the art will appreciate that the operations of FIG. 7 may vary according to embodiments of the present disclosure. For example, while the operations of FIG. 7 depict an analysis of health information between individual migrations of workload, in some embodiments analysis of health information may additionally or alternatively occur during migration of workload. In other embodiments, analysis of health information may occur in intervals of more than one migration. For example, a migration manager 114 may be configured to implement multiple migrations (e.g., 2, 10, 100, etc.) before analyzing health information to detect health of a service. These multiple migrations may occur in parallel, serial, or a combination thereof. For example, blocks 704 through 708 may be repeated multiple times (e.g., concurrently or iteratively) for each implementation of block 710. Thus, the interactions of FIG. 7 are intended to be illustrative.

Figure 8:
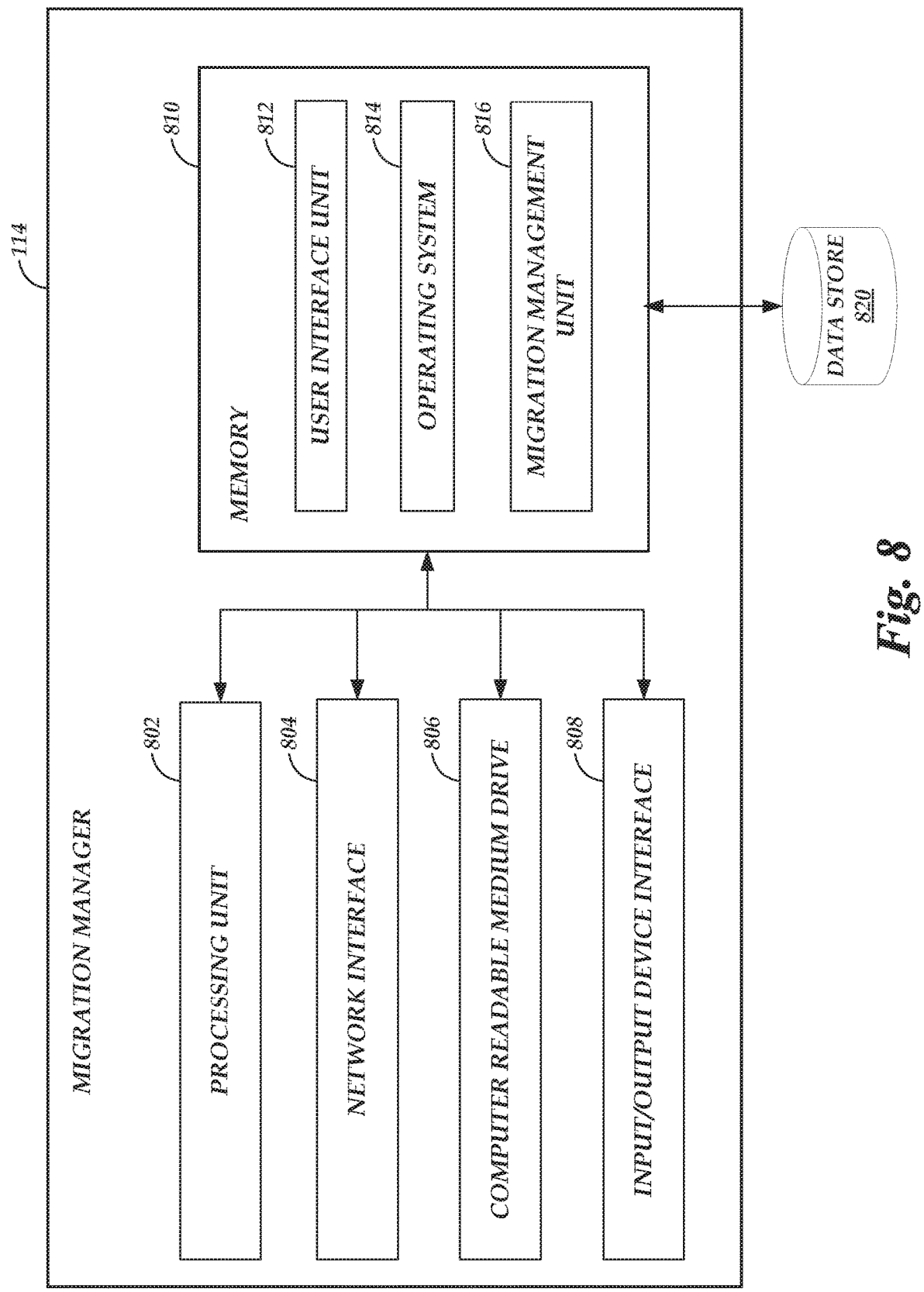
FIG. 8 depicts a general architecture of an embodiment of a computing device providing a migration manager of FIG. 1.

FIG. 8 depicts a general architecture of a computing system that implements the migration manager 114 of FIG. 1. The general architecture of the system depicted in FIG. 8 includes an arrangement of computer hardware and software modules that may be used to implement aspects of the present disclosure. The hardware modules may be implemented with physical electronic devices, as discussed in greater detail below. The system may include many more (or fewer) elements than those shown in FIG. 8. It is not necessary, however, that all of these generally conventional elements be shown in order to provide an enabling disclosure. Additionally, the general architecture illustrated in FIG. 8 may be used to implement one or more of the other components illustrated in FIG. 1. As illustrated, the system includes a processing unit 802, a network interface 804, a computer readable medium drive 806, and an input/output device interface 808, all of which may communicate with one another by way of a communication bus. The network interface 804 may provide connectivity to one or more networks or computing systems. The processing unit 802 may thus receive information and instructions from other computing systems or services via a, such as networks 104 or 116. The processing unit 802 may also communicate to and from memory 810 and further provide output information for an optional display (not shown) via the input/output device interface 808. The input/output device interface 808 may also accept input from an optional input device (not shown).

The memory 810 may contain computer program instructions (grouped as modules in some embodiments) that the processing unit 802 executes in order to implement one or more aspects of the present disclosure. The memory 810 generally includes RAM, ROM and/or other persistent, auxiliary or non-transitory computer readable media. The memory 810 may store an operating system 814 that provides computer program instructions for use by the processing unit 802 in the general administration and operation of the system. The memory 810 may further include computer program instructions and other information for implementing aspects of the present disclosure. For example, in one embodiment, the memory 810 includes a user interface unit 812 that generates user interfaces (and/or instructions therefor) for display upon a computing device, e.g., via a navigation and/or browsing interface such as a browser or application installed on the computing device. In addition, the memory 810 may include and/or communicate with one or more data repositories, such as the data store 820, which may correspond to any persistent or substantially persistent data storage, such as a hard drive (HDD), a solid state drive (SDD), network attached storage (NAS), a tape drive, or any combination thereof.

In addition to and/or in combination with the user interface unit 812, the memory 810 may include a migration management unit 816 that corresponds to computer-executable instructions which, when executed by the migration manager 114, implement the functions described above with respect to the migration manager 114. While the migration management unit 816 is shown in FIG. 8 as part of the migration manager 114, in other embodiments, all or a portion of the migration manager 114 may be implemented by other components of the distributed computing service environment 110 and/or another computing device. For example, in certain embodiments of the present disclosure, another computing device in communication with the distributed computing service environment 110 may include several modules or components that operate similarly to the modules and components illustrated as part of the migration manager 114.

While the computing device of FIG. 8 is described as implementing the migration manager 114, the same or a similar computing device may additionally or alternatively be utilized to implement other components of the distributed computing service environment 110. For example, such a computing device may be utilized, independently or in conjunction with other components (e.g., data stores) to implement the cell systems 122 of FIG. 1. The software or computer-executable instructions placed within the memory 810 may be modified to enable execution of the functions described herein with respect to the cell systems 122.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
analyzing health information for a network-accessible service to detect that a plurality of cell systems implementing the network-accessible service are in a healthy state, wherein individual cell systems comprise one or more computing devices configured to implement the network-accessible service on behalf of corresponding portions of clients;
while each cell system of the plurality of cell systems is detected to be in the healthy state, repeatedly initiating migrations of at least a portion of a workload from one individual cell system, selected from the plurality of cell systems independently of load on the one individual cell system and at least partly at random, to another individual cell system, selected from the plurality of cell systems independently of load on the other individual cell system and at least partly at random;
analyzing additional health information for the network-accessible service to detect that at least one cell system implementing the network-accessible service is in an unhealthy state; and
responsive to detecting that the at least one cell system implementing the network-accessible service is in an unhealthy state, halting the repeatedly initiated migrations.

2. The computer-implemented method of claim 1, wherein initiating at least one migration of the migrations comprises redirecting client communications from a first cell system of the plurality of cell systems to a second cell system of the plurality of cell systems.

3. The computer-implemented method of claim 1 further comprising selecting, for a first migration of the repeatedly initiated migrations, the portion of the workload according to at least partially random selection.

4. The computer-implemented method of claim 1, wherein a size of the portion of workload migrated during a first migration of the repeatedly initiated migrations is selected according to at least one of a time required to conduct the first migration or a target operational capacity of a cell system to which the portion of workload is migrated.

5. The computer-implemented method of claim 1, wherein repeatedly initiating the migrations comprises, between individual migrations:
obtaining further health information for the network-accessible service; and
analyzing the further health information to detect that the network-accessible service is in the healthy state.

6. The computer-implemented method of claim 1, wherein at least one migration of the migrations comprises at least one of: i) a migration of workload data from a first cell system, of the plurality of cell systems, to multiple other cell systems of the plurality of cell systems, ii) a migration of workload data from multiple cell systems, of the plurality of cell systems, to a single other cell system of the plurality of cell systems, or iii) a migration of workload data from a multiple cell systems, of the plurality of cell systems, to multiple other cell systems of the plurality of cell systems.

7. Non-transitory computer-readable media comprising computer-executable instructions that, when executed on a computing system, cause the computing system to:
    analyze health information for a network-accessible service to detect that plurality of cell systems implementing the network-accessible service are in a healthy state, individual cell systems comprise one or more computing devices configured to implement the network-accessible service on behalf of corresponding portions of clients;
    while each cell system of the plurality of cell systems is detected to be in the healthy state, initiate a set of migrations of at least a portion of a workload from one individual cell system, selected from the plurality of cell systems independently of load on the one individual cell system and at least partly at random, to another individual cell system, selected from the plurality of cell systems independently of load on the other individual cell system and at least partly at random;
    analyze additional health information for the network-accessible service to detect that at least one cell system implementing the network-accessible service is in an unhealthy state; and
    responsive to detecting that the at least one cell system implementing the network-accessible service is in an unhealthy state, halt the set of migrations.

8. The non-transitory computer-readable media of claim 7, wherein the health information is obtained from at least one of the plurality of cell systems or a system external to the plurality of cell systems.

9. The non-transitory computer-readable media of claim 7, wherein the computer-executable instructions further cause the computing system to repeatedly obtain and analyze updated health information during the set of migrations.

10. The non-transitory computer-readable media of claim 7, wherein the computer-executable instructions cause the computing system to analyze the health information at least partly by determining that the health information complies with pre-determined health thresholds.

11. The non-transitory computer-readable media of claim 7, wherein at least one migration of the set of migrations comprises redirecting client communications from a first cell system of the plurality of cell systems to a second cell system of the plurality of cell systems.

12. The non-transitory computer-readable media of claim 7, wherein at least one migration of the set of migrations comprises transferring data from a first cell system of the plurality of cell systems to a second cell system of the plurality of cell systems.

13. The non-transitory computer-readable media of claim 7, wherein the computer-executable instructions further cause the computing system to transmit a notification that the network-accessible service is in an unhealthy state.

14. The non-transitory computer-readable media of claim 13, wherein the notification includes a record of a migration, of the set of migrations, that occurred prior to detecting that the network-accessible service is in an unhealthy state.

15. A system to control migration of data between cells of a cell-based architecture implementing a network-accessible service, the system comprising:
    a plurality of cell systems forming the cell-based architecture, individual cell systems comprising one or more computing devices configured to implement the network-accessible service on behalf of corresponding portions of clients; and
    a migration manager including a processor configured with computer-executable instructions to:
        analyze health information for the network-accessible service to detect that the plurality of cell systems are in a healthy state;
        while each cell system of the plurality of cell systems is detected to be in the healthy state, repeatedly initiate migrations of at least a portion of a workload from one individual cell system, selected from the plurality of cell systems independently of load on the one individual cell system and at least partly at random, to another individual cell system, selected from the plurality of cell systems independently of load on the other individual cell system and at least partly at random;
        analyze additional health information for the network-accessible service to detect that at least one cell system implementing the network-accessible service is in an unhealthy state; and
        responsive to detecting that the at least one cell system implementing the network-accessible service is in an unhealthy state, halt the repeatedly initiated migrations.

16. The system of claim 15, wherein the workload comprises at least one of maintaining client information at a first cell system of the plurality of cell systems or conducting processing on behalf of a client at the first cell system.

17. The system of claim 15, wherein the health information comprises at least one of a record of computing resource usage at at least one cell system of the plurality of cell systems, a record of errors incurred at the at least one cell system, a record of responsiveness of the at least one cell system, or a record of human-generated issue reports submitted regarding the network-accessible service.

18. The system of claim 15, wherein the migration manager is further configured, subsequent to a first migration of the repeatedly initiate migrations, to:
    obtain further health information for the network-accessible service; and
    analyze the further health information to detect that the network-accessible service is in the healthy state,
    wherein the migration manager configured to initiate a next migration of the repeatedly initiated migrations in response to analysis of the further health information.

19. The system of claim 15, wherein migration of the portion of the workload comprises transferring data representing the portion of the workload from a first cell system, of the plurality of cell systems, to a second cell system of the plurality of cell systems.

* * * * *